A. W. H. LENDERS.
METHOD OF CURING STARCH.
APPLICATION FILED APR. 29, 1914.
1,260,983.
Patented Mar. 26, 1918.
3 SHEETS—SHEET 3.
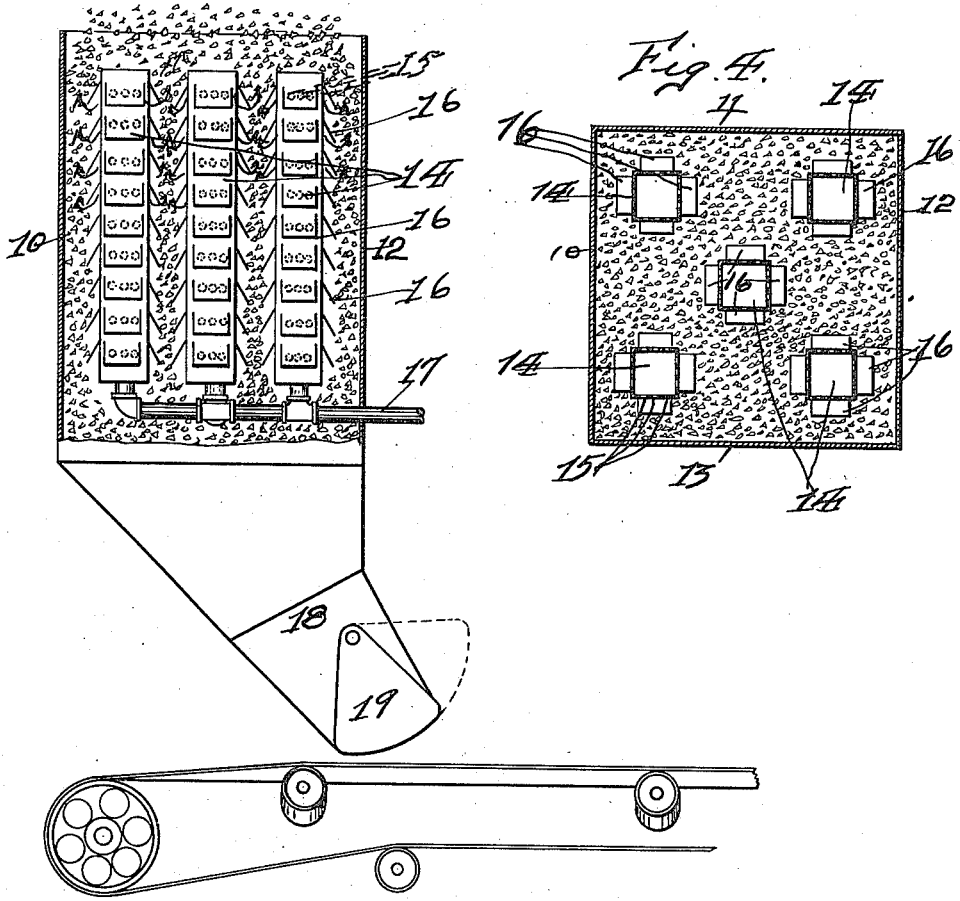

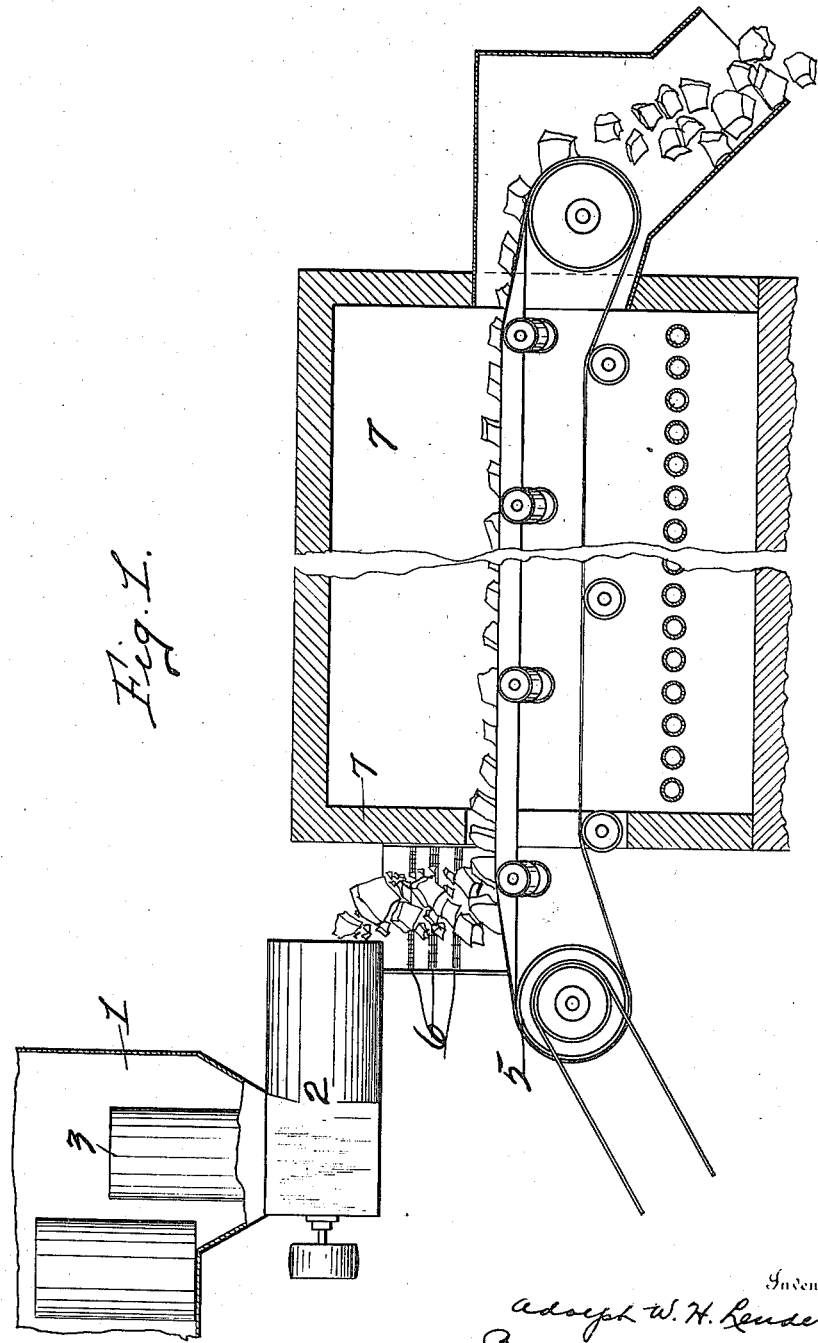

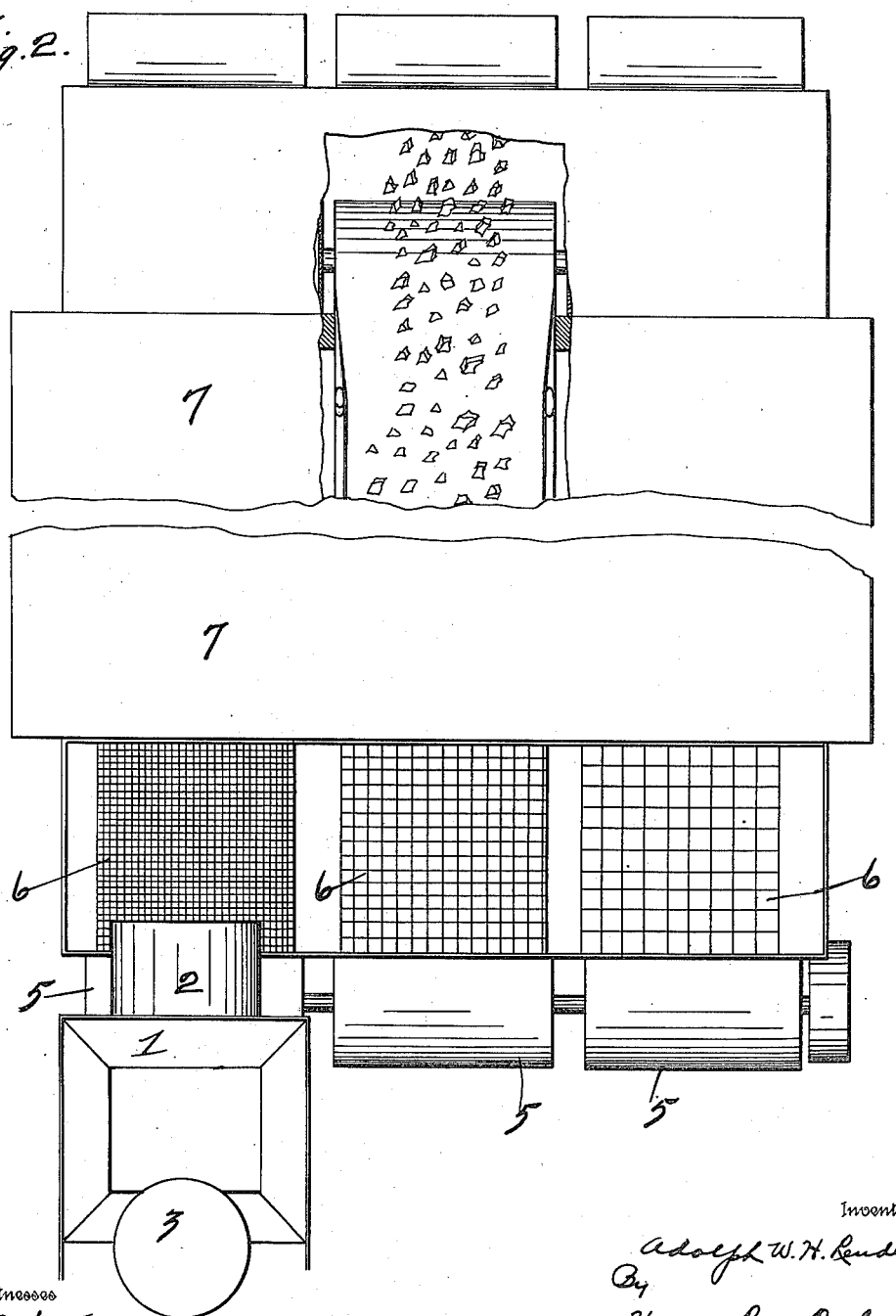

UNITED STATES PATENT OFFICE.

ADOLPH W. H. LENDERS, OF CEDAR RAPIDS, IOWA.

METHOD OF CURING STARCH.

1,260,983. Specification of Letters Patent. Patented Mar. 26, 1918.

Application filed April 29, 1914. Serial No. 835,065.

*To all whom it may concern:*

Be it known that I, ADOLPH W. H. LENDERS, a citizen of the United States, residing at Cedar Rapids, in the county of Linn and State of Iowa, have invented a certain new and useful Method of Curing Starch, of which the following is a specification.

The method at present employed with which I am familiar, consists of cooling starch in cylinders in which it has been subjected to great pressure usually by means of hydraulic presses. The contents of the cylinder is then ejected onto a grating and is broken up by means of sledge hammers, the broken up pieces passing through the grating onto a cutting machine which cuts the larger chunks up into pieces of the desired size, after which the starch is transferred to curing trays. The trays are then placed upon portable trucks or wagons, and are wheeled to the drying kilns in which they are placed and left to cure, the operation being accomplished by means of air.

It is well known to those familiar with the art that the result of this operation is that the starch is piled on the trays in all sizes from the fine starch to the large lumps. The shaking of the wagons which carry the trays cause the finer particles of starch to settle toward the bottom of the tray with the result that it closely envelops the sides of the larger lumps, and completely envelops the smaller ones. This results in a supply of moisture accruing in the starch and necessitates it remaining in the kiln for a greater length of time to properly cure it than would be needed if the air could get in direct contact with all of the surfaces of the lumps. This consumption of time is of the utmost importance as it greatly increases the expense of producing the starch.

After the starch is cured, the wagons are removed from the kilns and the trays are emptied upon sorting shakers where it is sorted into various sizes for different uses. From this point it is delivered to the packers. This operation requires a great deal of hand labor and is very slow and costly.

My invention has for its object to provide a method which, when followed, will do away with all of the hand labor and will permit the automatic delivery to the packer of a completely cured and sorted starch; to accomplish this the starch is sorted into various sizes so that there is no possibility of the starch dust or flour enveloping the larger lumps thereby preventing the air from contacting with all sides of them and thoroughly and quickly curing the starch automatically kept in continuous motion or transit throughout the operation.

I have shown in the illustrations which accompany this application, a form of apparatus which may be utilized to carry out my process.

My means of accomplishing the foregoing objects may be more readily understood by having reference to the accompanying drawings, which are hereunto annexed and are a part of this specification, in which:

Figure 1, is a side elevation showing the apparatus for carrying out my improved method.

Fig. 2, is a top or plan view of the same.

Fig. 3, shows a modified form of apparatus.

Fig. 4, is a cross-section of the apparatus shown in Fig. 3.

Similar reference numerals refer to similar parts throughout the entire description.

As shown in the drawings, 1, indicates a bin immediately above the cutting machine 2. The cylinder of starch 3, after being freed from the metal cylinder in which it has been pressed by hydraulic pressure, is dropped directly into the cutting machine, which cuts the larger lumps up into pieces of the desired size from whence it passes into a series of sorting shakers which sort it into several sizes and deliver it to belt conveyers. It will be apparent that as the lumps are of angular configuration there will always be spaces intermediate the lumps, so that the air can reach all of the surfaces thereof, during the curing process. These conveyers extend from the sorting shakers 6 to the kiln 7, through which they pass very slowly. The kiln 7, can be made of sufficient length so that the time of travel through it will be sufficient to cure the starch during transit.

When the starch is cured, it is delivered by the conveyers 5, from the other end of the kiln to conveyers, which carry it to the packers, where it is packed ready for shipping.

In practice, it may be found desirable to cure the smaller lumps of starch by passing it downwardly through a bin such as is shown in Figs. 3 and 4, in which the bin is composed of four walls 10, 11, 12 and 13.

Inside of these walls are located a plurality of upwardly extending tubes or pipes 14. The sides of these tubes are provided with a plurality of perforations 15, which are protected by means of a plurality of downwardly flaring plates or shields 16, which prevent the starch, in its downward travel, from entering the holes 15, but do not interfere with the escape of the air which passes through the perforations 15, and passes upwardly through the starch bin as indicated by the arrows.

Pipes 17, leading from a suitable source of compressed air supply, may be led to the interior of the pipes 14. 18 is the discharge hopper of the bin in question, and it may be found desirable to provide this with a valve 19, which will prevent the too ready escape of the starch in which case the movement of the starch will be intermittent, or it may be found desirable to arrange the opening 18, in juxtaposition to a moving conveyer, which may be so timed as to draw the starch out at the exact rate which will permit it to be thoroughly cured during its movement through the bin.

It will be apparent that the operation is automatic throughout, and that the starch in its movement traveling as it does through or against a current of air, it necessarily follows that all of the surfaces of the lumps of starch are brought into contact with the air, and the starch is thoroughly cured.

It will be noted that throughout the entire specification I have referred to "air", as being the curing means, but I preferably employ heated air, as at the present time from twenty-four to forty hours are required to properly cure the starch, while I have found in practice that by employing heated air while the starch is in transit, I can reduce this time from two to eight hours as in my process I have determined by experiment that the air is brought into contact with all of the surfaces of the starch thus dehydrating it with great rapidity.

Although I have described a specific form of apparatus to accomplish this result, it is apparent to persons skilled in the art, that the same is merely for disclosing a concrete embodiment of apparatus which will serve to utilize my improved method, for the invention is not assumed to reside in the precise form of apparatus, but in the method of keeping the starch continuously moving while it is being cured and curing different sizes separately when desired, as described in the hereinafter contained claims.

Having described my invention what I regard as new, and desire to obtain by Letters Patent is:

1. The method of curing starch which consists in cutting the uncured starch into lumps of various sizes, aggrouping lumps of substantially uniform sizes and causing the lumps to travel separately but continuously and in the same horizontal plane through a curing kiln, and subjecting the starch to a current of heated air while within the kiln.

2. The method of curing starch which consists in cutting the uncured starch into lumps of various sizes, aggrouping lumps of substantially uniform sizes, causing said groups to travel separately through a drying kiln, and separately subjecting the groups to a current of heated air, said air being directed against the groups of the finest lumps so as not to oppose or change the direction of travel of the said lumps.

In testimony whereof, I have signed the foregoing specification.

ADOLPH W. H. LENDERS.

Witnesses:
A. M. DOUGLAS,
H. A. HORAN.